F. W. WHITNEY.

CHILDREN'S CARRIAGES.

No. 7,216. Reissued July 4, 1876.

Witnesses:

W. B. Masson

W. E. Schaffer

Inventor:

Francis W. Whitney

By E. E. Masson atty.

N. PETERS, PHOTO-LITHOGRAPHER, WASHINGTON, D. C.

UNITED STATES PATENT OFFICE.

FRANCIS W. WHITNEY, OF LEOMINSTER, MASSACHUSETTS, ASSIGNOR TO F. A. WHITNEY CARRIAGE COMPANY.

IMPROVEMENT IN CHILDREN'S CARRIAGES.

Specification forming part of Letters Patent No. 166,237, dated August 3, 1875; reissue No. 7,216, dated July 4, 1876; application filed April 27, 1876.

*To all whom it may concern:*

Be it known that I, FRANCIS W. WHITNEY, of Leominster, in the county of Worcester and State of Massachusetts, have invented certain new and useful Improvements in Children's Carriages; and that the following is a full, clear, and exact description of the same, reference being had to the accompanying drawings, making a part of this specification, in which—

Figure 1:
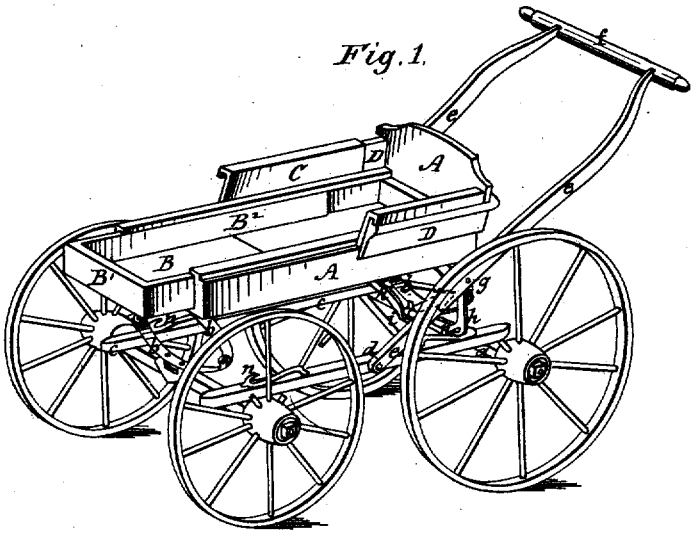
Figure 2:
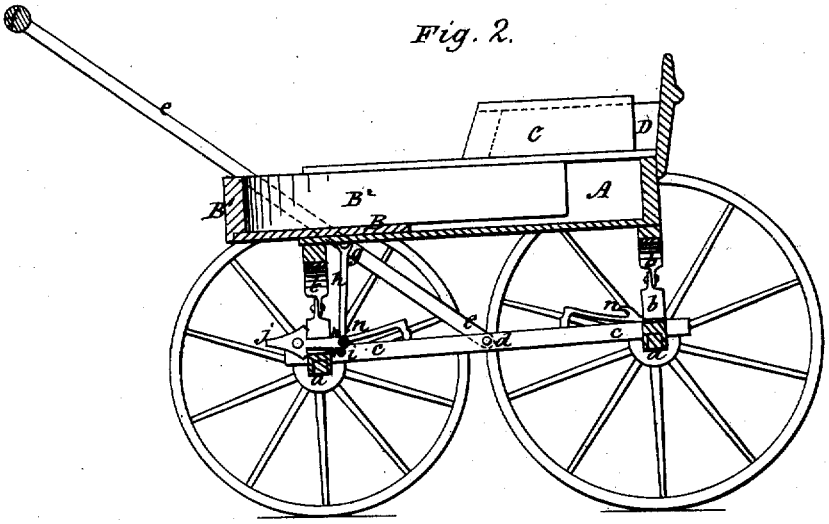
Figure 3:
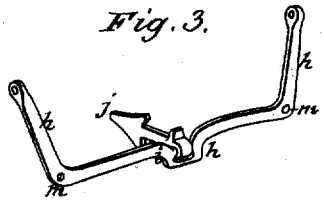

Figure 1 represents, in perspective, a child's carriage, having the body or drawer slightly drawn out, as when elongating the body of the carriage to form a couch. Fig. 2 represents a vertical longitudinal section through the carriage. Fig. 3 represents, in perspective, and detached from the carriage, the reversible handle attachment for pushing or pulling the carriage either end foremost.

My invention relates, first, to a sliding drawer having a bottom, front, and continuous sides, in connection with the body of a child's carriage, for the purpose of elongating said body when desired, to form a couch and a continuous receptacle for the reception and security of the toys, &c., of the child occupying the carriage, as will be explained. My invention also relates to the combination of a handle pivoted to the reach of the carriage, so as to swing freely past the body thereof, a bail or bent bar pivoted to said handle, and a latch or catch pivoted to said bail or bar, for reversing the handle and fastening it in either of its reversed positions. It also relates to the combination of the holes in or angles of the hinged bail or bar with the hooks or catches at each of the ends, or nearly so, of the carriage, so that the bail or bar may be locked against rising when the handles are used for raising up the carriage to pass or mount obstructions.

To enable those skilled in the art to make and use my invention, I will proceed to describe the same with reference to the drawings.

Connected with the body A of the carriage there is a drawer, (having a bottom, B, front $B^1$, and sides $B^2$,) which may be drawn out to elongate the body of the carriage, and form with said carriage an uninterrupted and continuous receptacle when the occupant is to be placed in a reclining posture, and which may be slid back when in a sitting position. This drawer moves in ways or guides in the sides of the body A, and in no wise interferes with or obstructs the interior of the body for any of its uses or purposes. A seat can be provided at one end of the body, in the usual well-known way, and be removable, when so desired, when the body is to be converted into a couch. There is also a back support for a pillow to rest against, or the seat, back, and arm supports may be upholstered, in whole or in part, to suit the fancy or convenience of the users.

I have shown the arm-supports C as made removable upon the permanent parts D, for the purpose of more closely packing or "nesting" the bodies for transportation, or to shift them to other bodies. The parts C move in guides or grooves in or on the parts D, so as to retain them in proper position on the sides of the body. The body A of the carriage is supported upon the axles *a a* of the running-gear, through the medium of springs *b*, and *c c* are two reaches which couple the axles together. To the reaches *c c* are pivoted, as at *d*, the two arms *e e*, which are united at their free ends by a bar or rung, *f*, which, together with the arms *e e*, constitutes the handle by which the carriage is drawn or pushed. The arms *e*, being outside of the body of the carriage, are free, when not otherwise restrained, to swing to or from either end of the body to the opposite end, so as to draw or push the carriage either end foremost. To the arms *e*, at a point, *g*, thereon, are pivoted the ends of a bent bail-shaped bar, *h*, (better seen in Fig. 3,) which swings underneath the body of the carriage as the handles are reversed from one end of the body to the other, and centrally upon this bent bar or bail, as at *i*, there is pivoted a latch or catch, *j*, that drops over and catches upon the under part of the spring, or, in the absence of springs, upon a catch-iron secured to the axle, or near thereto, so as to hold the handles or handle in position while drawing or pushing the carriage by said handle; and to further lock the handle in position, and to admit of its being used to raise up the wheels to pass any eminence or obstruction, there are two holes or eyes, *m m*, made at the bends or angles of the bar *h*, which, as said bar is swung into position to allow the latch or catch *j* to take over its keeper, take in the two hooks *n n* on the reaches or upon the axles, one set of hooks being arranged at or near each end of the pair of reaches, or upon the axles, so as to thus fasten the handle at each end of the carriage, and these hooks hold the handle to the carriage when said handle is used for raising up the carriage to pass any obstruction or elevation, or to lower it after so passing. The latch and the hooks and eyes are self-acting, or may be so to a great extent; but the latch alone would not hold the handle in place while lifting the carriage up to pass obstructions, as stated.

Instead of the hooks taking into the eyes or holes *m m*, which I prefer, they may catch over the corners or angles of the bail, and so hold without the holes or eyes; but the latter are preferable.

I am aware that the lower portion of the body of ordinary carriages has been extended to give room for additional seats by drawing out an extension carrying said seats; and I do not claim this construction when so applied. I am aware that reversible handles for children's carriages have long been used, and, of course, I do not claim such handles *per se*, my invention relating more essentially to the appliances or attachments by which I readily detach, reverse, and secure such handles to the carriage.

Having thus fully described my invention, what I claim is—

1. In combination with the body of a child's carriage, the extension-drawer, having a bottom, front, and continuous sides, for the purpose of elongating said body and forming a continuous receptacle, substantially as described.

2. In combination with the reversible handles *e*, the bar *h*, pivoted to said handles, and the latch *j*, hinged to said bar, so as to latch said handles at or to either end of the carriage, substantially as described and represented.

3. In combination with the pivoted or swinging handles *e* and bar *h*, the holes or eyes *m*, or bends or angles in the bar, and the hooks *n n* on the reaches or axles, for locking the handles to the carriage, so that the latter may be raised up and let down by the former, as and for the purpose described.

FRANCIS W. WHITNEY.

Witnesses:
C. H. MERRIAM,
P. LOTHROP.